(12) United States Patent
Gordon et al.

(10) Patent No.: US 11,809,018 B2
(45) Date of Patent: *Nov. 7, 2023

(54) EYEWEAR WITH REMOVABLY ATTACHABLE TOP

(71) Applicant: Pair Eyewear, Inc., New York, NY (US)

(72) Inventors: Philip Denton Gordon, Ladera Ranch, CA (US); Lee Zaro, Rancho Palos Verdes, CA (US); Nathan Kondamuri, Brooklyn, NY (US); Sophia Edelstein, Brooklyn, NY (US); William Scott Craycraft, Trabuco Canyon, CA (US)

(73) Assignee: Pair Eyewear, Inc., New York, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/858,908

(22) Filed: Jul. 6, 2022

(65) Prior Publication Data

US 2023/0125372 A1 Apr. 27, 2023

Related U.S. Application Data

(63) Continuation of application No. 17/580,483, filed on Jan. 20, 2022, now Pat. No. 11,409,135.

(60) Provisional application No. 63/289,575, filed on Dec. 14, 2021, provisional application No. 63/272,397, filed on Oct. 27, 2021.

(51) Int. Cl.
*G02C 11/02* (2006.01)
*G02C 1/06* (2006.01)

(52) U.S. Cl.
CPC .............. *G02C 11/02* (2013.01); *G02C 1/06* (2013.01); *G02C 2200/02* (2013.01); *G02C 2200/08* (2013.01)

(58) Field of Classification Search
CPC ........................................................ G02C 9/04
USPC ....................................................... 351/51, 52
See application file for complete search history.

(56) References Cited

U.S. PATENT DOCUMENTS

| 4,958,923 A | 9/1990 | Rosenson |
| 5,181,051 A | 1/1993 | Townsend et al. |

(Continued)

FOREIGN PATENT DOCUMENTS

| CN | 2662279 Y | 12/2004 |
| CN | 202649610 U | 1/2013 |

(Continued)

OTHER PUBLICATIONS

Sterling, S. "Customize Your Glasses." YouTube, YouTube, Feb. 14, 2021, https://www.youtube.com/watch?v=zE2WNuXUB2M. (Year: 2021).*

(Continued)

*Primary Examiner* — Zachary W Wilkes
(74) *Attorney, Agent, or Firm* — Knobbe, Martens, Olson & Bear LLP

(57) ABSTRACT

An eyeglass system includes interchangeable anterior aesthetics. The system includes a base frame, including a front face with a left lens orbital carrying a left lens and a right lens orbital carrying a right lens, and left and right earstems attached to the front frame. A decorative top frame includes a left annular mask with an unobstructed left opening and a right annular mask with an unobstructed right opening, configured to cover the left and right orbitals, respectively, while exposing the left and right lenses through the left and right openings. The top frame is releasably connectable to the base frame. The system may include a plurality of visually distinct top frames, each interchangeably removably connectable to a common base frame.

10 Claims, 7 Drawing Sheets

(56) References Cited

U.S. PATENT DOCUMENTS

| | | | |
|---|---|---|---|
| 5,737,054 A | 4/1998 | Chao | |
| 6,116,732 A | 9/2000 | Xiao | |
| 6,783,238 B1 | 8/2004 | Stepper | |
| 6,811,254 B2* | 11/2004 | Ifergan | G02C 9/02 |
| | | | 351/57 |
| 6,957,890 B2 | 10/2005 | Shapiro | |
| 7,296,888 B2 | 11/2007 | McKenna et al. | |
| 7,556,373 B2 | 7/2009 | VanAtta et al. | |
| 7,677,721 B2 | 3/2010 | Siu | |
| 8,236,922 B2 | 8/2012 | Warakomski et al. | |
| 8,905,540 B2 | 12/2014 | Johnson | |
| 9,081,213 B2 | 7/2015 | Weinberg | |
| 9,341,865 B2 | 5/2016 | Sheldon et al. | |
| 9,400,401 B2 | 7/2016 | Darcy | |
| 9,606,372 B2 | 3/2017 | Berdan | |
| 11,409,135 B1* | 8/2022 | Gordon et al. | G02C 11/02 |
| 2002/0080325 A1 | 6/2002 | Xiang | |
| 2002/0097372 A1 | 7/2002 | Zelman | |
| 2002/0131012 A1 | 9/2002 | Tsai | |
| 2003/0086053 A1 | 5/2003 | Waters | |
| 2005/0094090 A1 | 5/2005 | Nishioka | |
| 2006/0126007 A1 | 6/2006 | Smith | |
| 2006/0176444 A1 | 8/2006 | Lerner | |
| 2006/0187404 A1 | 8/2006 | Ifergan | |
| 2007/0273823 A1 | 11/2007 | Lee et al. | |
| 2008/0036961 A1 | 2/2008 | Zhou | |
| 2008/0084532 A1 | 4/2008 | Kurtin | |
| 2008/0088791 A1 | 4/2008 | Smith | |
| 2009/0096982 A1 | 4/2009 | Heim | |
| 2010/0309425 A1 | 12/2010 | Zelazowski | |
| 2011/0051074 A1 | 3/2011 | Arnell | |
| 2013/0114039 A1 | 5/2013 | Zelazowski | |
| 2013/0235333 A1 | 9/2013 | Waters | |
| 2014/0293214 A1 | 10/2014 | Wang | |
| 2015/0077695 A1 | 3/2015 | Rattelade | |
| 2016/0377890 A1* | 12/2016 | Corcoran | G02C 11/02 |
| | | | 351/52 |
| 2017/0184872 A1 | 6/2017 | Silver | |
| 2017/0269382 A1 | 9/2017 | Wang | |
| 2018/0129075 A1 | 5/2018 | Zewe | |
| 2020/0096793 A1 | 3/2020 | Jin et al. | |
| 2020/0292843 A1 | 9/2020 | Villalpando et al. | |

FOREIGN PATENT DOCUMENTS

| | | |
|---|---|---|
| CN | 203673163 U | 6/2014 |
| CN | 204331186 U | 5/2015 |
| CN | 204855977 U | 12/2015 |
| CN | 205388668 U | 7/2016 |
| CN | 113189796 A | 7/2021 |
| EP | 1647854 A1 | 4/2006 |
| EP | 2875400 A1 | 5/2015 |
| EP | 3326024 A1 | 5/2018 |
| FR | 2900743 A1 | 11/2007 |
| GB | 2518986 A | 4/2015 |
| KR | 101799900 B1 | 11/2017 |
| WO | 2013064710 A1 | 5/2013 |
| WO | 2015049526 A1 | 4/2015 |
| WO | 2021138607 A1 | 7/2021 |

OTHER PUBLICATIONS

Arctica. "Sports Eyewear." Technology, Mar. 27, 2019, https://www.arctica.eu/t30/technology (Year: 2019).*

Burnett, Mark, creator. Shark Tank. ABC, S11 E14, Mar. 6, 2020, Hulu, www.hulu.com/watch/cbcf7312-9283-432c-bf10-a08404c4f412, entire video; also pp. 1-3 of screenshots attached.

EdieAnne - the BNS Channel, creator, YouTube.com, Pair Eyewear Glasses & Toppers unboxing, Nov. 3, 2020, https://www.youtube.com/watch?v=7jC7dYodV1M, entire video; also, pp. 1-2 of screenshots attached.

Sterling, S. "How to Make Magnetic Glasses Toppers." A Big Red Bow, Feb. 14, 2021, https://abigredbow.com/?p=50. (Year: 2021).*

Supplier Invoice for Manufacturing of TR-90 Top Frames for Patent Owner, Aug. 17, 2020, pp. 1-6.

* cited by examiner

EYEWEAR WITH REMOVABLY ATTACHABLE TOP

RELATED APPLICATIONS

This application is a continuation of U.S. Pat. Application No. 17/580,483, filed on Jan. 20, 2022, which claims the benefit under 35 U.S.C. § 119(e) of U.S. Provisional Pat. Application No. 63/272,397, filed on Oct. 27, 2021, and entitled, "EYEGLASS WITH INTERCHANGEABLE DECORATIVE TOP," and U.S. Provisional Pat. Application No. 63/289,575, filed on Dec. 14, 2021, and entitled, "EYEGLASS WITH REMOVABLY ATTACHABLE TOP," the entire contents of all of which are hereby incorporated by reference herein and made a part of this specification for all that they disclose.

BACKGROUND

The present inventions relate generally to manufacturing systems and eyeglasses configured for removably receiving one or more components.

The eyewear industry has developed countless eyeglass designs over time. Some of these designs provide not only optical performance, but additional fashion or functionality. Fashion trends in eyewear have drifted in recent years from leaner, wiry versions to those that are larger, wider, and often more highly decorated with graphics or ornamentation. Unfortunately, the price of eyeglasses, particularly glasses carrying an ophthalmic prescription, make it impractical for many wearers to be able to enjoy multiple artistic expressions without significant redundancy and expense.

Thus, there remains a need for an eyeglass and corresponding manufacturing system that economically enables wearers to exhibit greater artistic expression in the appearance of their eyeglasses.

SUMMARY

The present application discloses various new mechanisms, eyewear products, pairing tools, manufacturing, and methods that will further revolutionize the eyewear industry. For example, implementations of some of the embodiments disclosed herein enable a wearer to personally customize their eyeglasses with any of a variety of selected eyewear components, such as ornamental designs, emblems, and logos, or textual content, to name a few.

Presently in the eyewear industry, a consumer may select preassembled eyeglasses having any of a variety of designs, colors, components, or other features. While this provides a pseudo-customized final product, the eyeglasses typically cannot be further manipulated or modified after delivery to the consumer. One exception is eyeglasses that allow the consumer to remove and replace the lenses and/or nosepiece of the eyeglasses. Nevertheless, there is a need in the art for a modular system that enables the aesthetic expression of eyeglasses to be uniquely and/or repeatedly modified based on the wearer's preference.

In some embodiments, there is provided an eyeglass system with interchangeable anterior aesthetics. The system comprises a base frame, including a front frame with left lens orbital carrying a left lens and a right lens orbital carrying a right lens, and left and right earstems attached to the base frame and a top frame (such as a decorative top frame), including a left annular portion or mask defining or surrounding or substantially surrounding an unobstructed left opening, and a right annular portion or mask defining or surrounding or substantially surrounding an unobstructed right opening, configured to cover and/or to be positioned anterior to the left and right orbitals, respectively while exposing the left and right lenses through the left and right openings. The top frame may be releasably connectable to the base frame.

The top frame may comprise a posterior layer and an anterior layer, and an aesthetic enhancement may be carried by and/or displayed on the anterior layer. The posterior layer may be optically transparent. The anterior layer may have a thickness of less than or equal to about 1 mm.

The top frame may comprise a first magnet and/or a first set of magnets, configured to couple to a second, complementary magnet and/or second set of magnets carried by the base frame. The first and the second magnets may be neodymium magnets.

The base frame and the top frame may be curved in a horizontal and/or a vertical plane. In some embodiments, the base frame and/or the top frame may comprise at least one curved surface, such as a curved surface with a base curve of less than or equal to about base 4 curve.

In some embodiments, there is provided a dual-frame eyeglass system with enhanced resistance to shear force detachment. The system includes a base frame configured to extend between a left end and a right end, across a wearer's field of view, the base frame generally conforming to an arc in a horizontal plane, and a complementary top frame configured to tightly, snuggly, and/or securely nest over an anterior surface of the base frame and generally conforming to the arc in a horizontal plane. First and second magnetic connectors and/or sets of connectors are configured to secure the top frame to the base frame. Lateral disruption force applied to the top frame is resisted by both the magnetic connectors and lateral interference attributable to the nested curvature of the base frame and the top frame.

Each magnetic connector may comprise a first magnet carried by the base frame and a second, complementary magnet carried by the top frame.

The top frame may comprise a left orbital and a right orbital surrounding left and right unobstructed openings. The top frame may comprise an optically opaque anterior layer and an optically transparent posterior layer. An aesthetically modified surface may be provided on the top frame. The aesthetically modified surface may be on the anterior layer. The aesthetic modification can be a difference in design or decoration between the appearance of the top frame and the front frame of the base frame.

In some embodiments, there is provided a decorative eyeglass top frame configured to magnetically connect to an anterior surface of a complementary base frame. The top frame comprises an arcuate mask having a left orbital connected to a right orbital by a bridge, the mask configured to magnetically attach to the anterior side of a front face of a base frame and visually mask non-optical parts of the base frame from a straight-ahead viewing angle. The mask may have a substantially constant radius of curvature in a horizontal plane, and a left magnet and a right magnet configured to couple with complementary left and right magnets on the base frame. The mask left and right orbitals may surround unobstructed openings through the mask.

The mask may comprise a plurality of layers (e.g., two layers), which may include an optically opaque (e.g., anterior) layer and an optically transparent (e.g., posterior) layer. The top frame may further comprise an aesthetic anterior surface. The aesthetic anterior surface may be a graphic pattern or a color that is different from a graphic pattern or a color of the underlying mask, an image, or a logo of the front frame of the base frame of the eyewear.

DETAILED DESCRIPTION

While the present description sets forth specific details of various embodiments, it will be appreciated that the description is illustrative only and should not be construed in any way as limiting. Additionally, it is contemplated that although the top frame and base frame feature are primarily disclosed in the context of dual-lens eyewear systems, such features can be implemented in both unitary and dual-lens eyewear systems, helmets, goggles, hats, caps, or other wearable articles or devices. Any structure, feature, composition, method, or step that is illustrated and/or described in any embodiment in this specification can be used by itself or with or instead of any other structure, feature, composition, method, or step that is illustrated and/or described in any other embodiment or that is known in the art. In accordance with the ordinary meaning in this field, the term "eyeglass" encompasses products with any type of lens or lenses, including glass or plastic lenses. No feature illustrated and/or described in any embodiment is indispensable or essential. The relative proportions and sizes of all components illustrated in the accompanying drawings are intended to form part of the supporting disclosure of this specification but should not be considered limiting except to the extent that these relative proportions and/or sizes are expressly recited in a particular claim.

Although particular embodiments may be disclosed or shown in the context of frames (e.g., front frames or top frames) having full orbitals, such embodiments can be used with frames having partial orbitals or rimless frames. Furthermore, various applications of features disclosed herein and modifications thereto, which may occur to those who are skilled in the art in view of the present disclosure, are also encompassed by the scope of the present invention.

Some embodiments enable a wearer to selectively, reversibly modify, or personalize their eyeglasses to exhibit any of a variety of decorative aesthetics and/or informational content.

In some embodiments, one or more aesthetic modifications to the eyeglasses do not affect the stability or optical quality of the eyeglasses. For example, the top frame is not only easily incorporated into the eyeglass but is preferably securely retained by the eyeglass without affecting the optical quality or fit of the eyeglass.

Figure 1:
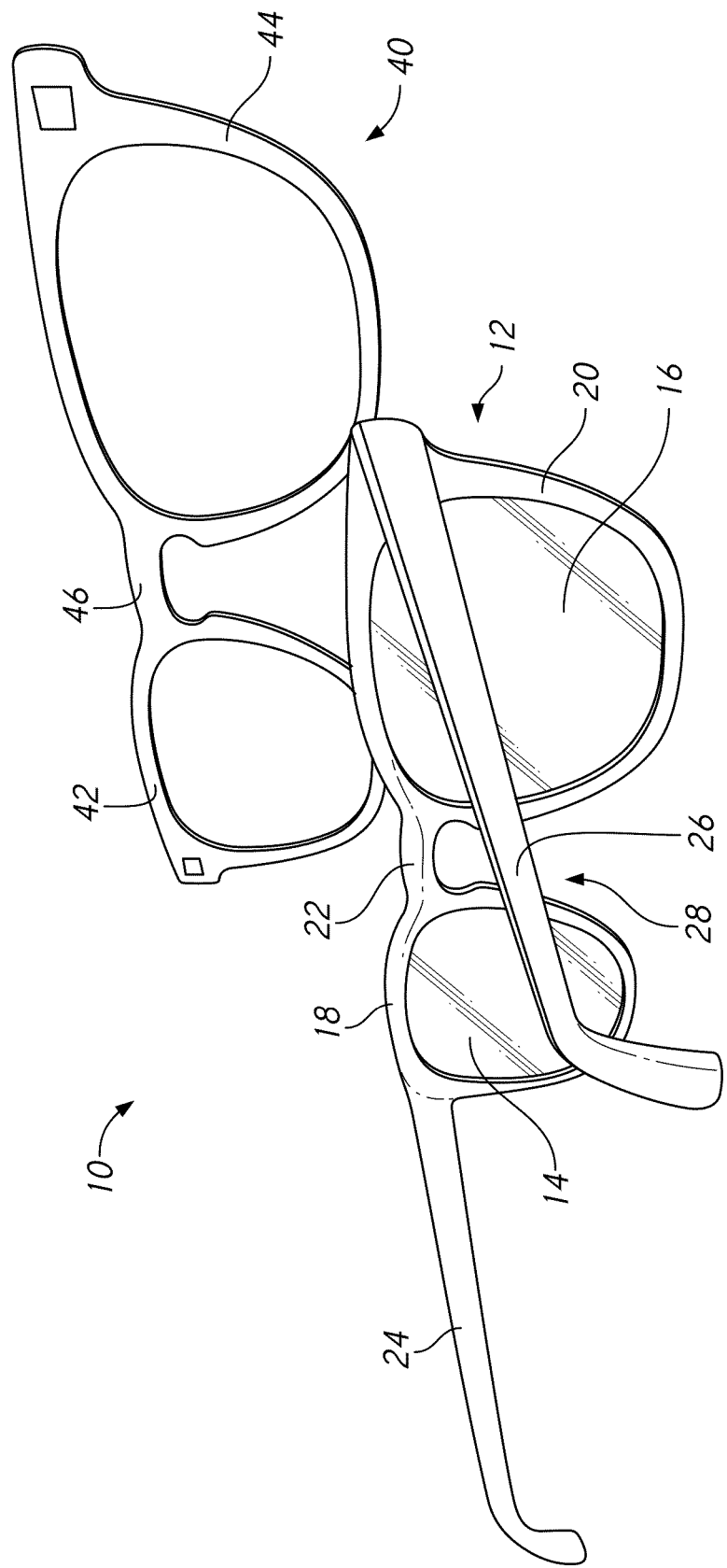
FIG. 1 is a rear perspective, exploded view of an eyeglass and top frame in accordance with an embodiment of the present invention.
Figure 2:
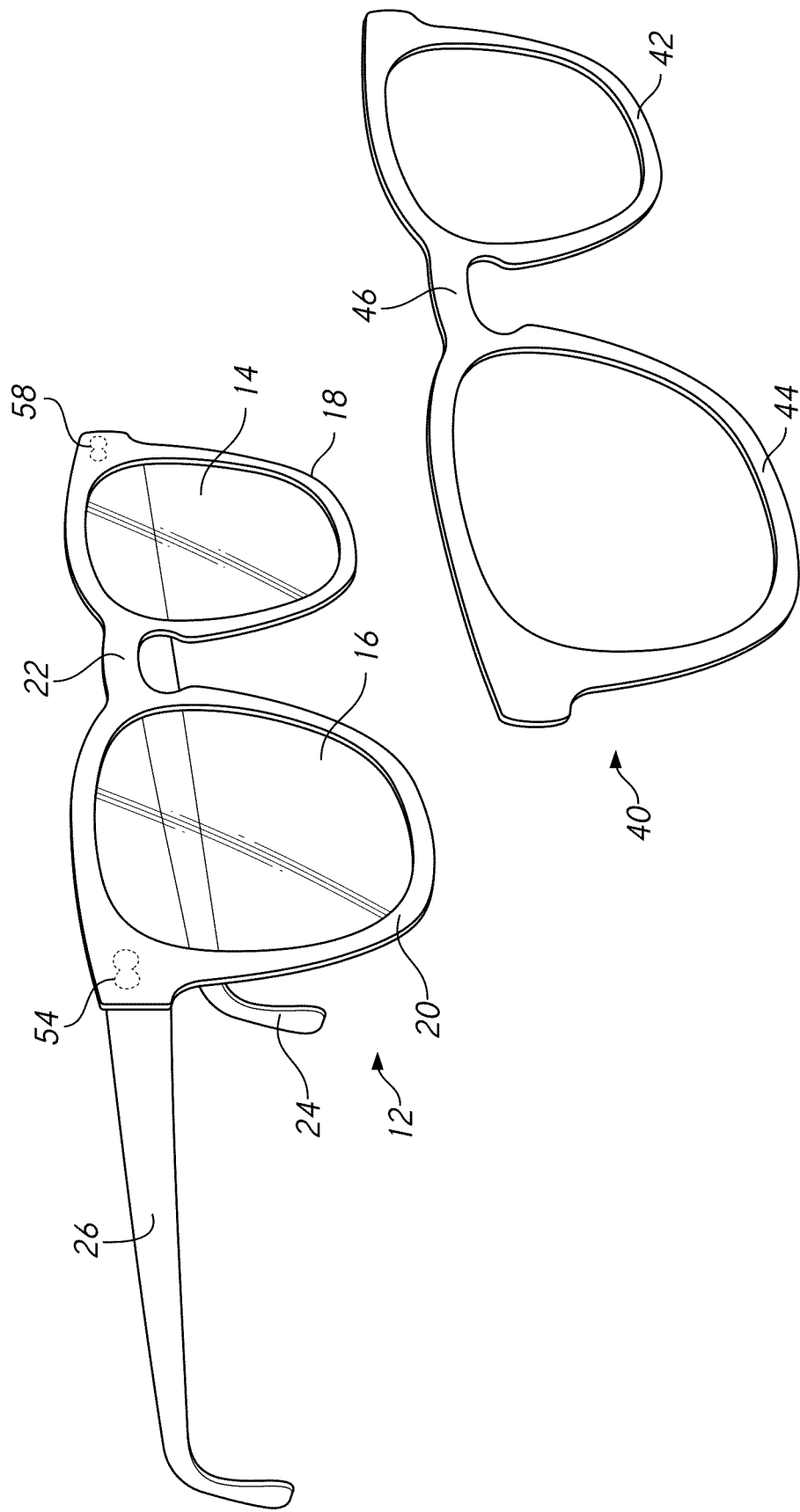
FIG. 2 is a front perspective, exploded view of the eyeglass and top frame of FIG. 1.

Referring to FIG. 1, in some embodiments, the eyeglass 10 generally comprises a base frame that comprises a front frame 12 which, in the illustrated embodiment, supports a left lens 14 and a right lens 16, and a pair of earstems 24, 26. Although the illustrated examples are shown as a dual-lens system, it is to be understood that the features, structure, methods, and/or principles discussed herein are readily applicable to the production of frames for a wide variety of eyewear including unitary lens eyeglass systems and protective goggle and helmet systems as well. In some embodiments, any part of the eyewear 10, including the front frame 12 and/or the top frame 40, may be formed of any suitable material, such as a polymer or plastic material (e.g., TR90, cellulose acetate, cellulose acetate propionate, xylonite, nylon, blended nylon), a metal material (e.g., aluminum, stainless steel, iron, titanium, etc.), and/or a composite material (e.g., carbon fiber). Frames that include polymer or plastic material may provide various advantages, such as high malleability or deformability during assembly of the lens to the frame, low cost, low weight of the frame, and/or many varieties in colors and style, etc.

The example of eyewear shown in the figures is dual-lens eyewear, but anything shown or described in this specification can be used with appropriate adjustments in any other eyewear, such as an eyewear shield system or a single-lens or monolens eyewear. The example of eyewear shown in the figures comprises lens-receiving regions with orbitals that are closed, integral, and unitary with the rest of the front face of the eyewear. The example orbitals are closed in that each orbital fully surrounds the inserted lens. A closed orbital can be formed of one or more separate pieces connected together (not shown). The example orbitals are integral in that they are formed of a single piece of material, without requiring connectors to attach components of the orbital to each other during insertion or removal of a lens. The example orbitals are unitary with the rest of the front face 12 of the eyewear 10 in that they are formed of a single piece of material with the rest of the front face 12 of the eyewear 10, without requiring connectors to attach the orbitals to the rest of the front face 12 of the eyewear 10. Many other structures and configurations can be used instead of or in addition to those illustrated in the examples. The orbitals 18, 20 illustrated and/or described are examples. Any suitable lens-receiving region can be used, whether or not it is an orbital with these features, or whether or not it is an orbital at all.

The lens(es) 14, 16, shield, or other optical barrier or optically enhancing component, used in the eyewear can be of any suitable type: plano, ophthalmic or prescription, spherical, cylindrical, toroidal, darkening or light-attenuating, UV-protecting, polarizing, molded to shape, cut from lens blanks, interference-layer coated, anti-scratch, antiglare, antireflective, antifog, and/or any other type of lenses. In some embodiments, the lens(es), shield, or other optical barrier or optically enhancing component is or are formed of a suitable material such as plastic (e.g., polycarbonate), glass, or any other material suitable for a particular application or use.

The front frame 12 generally comprises a first orbital 18 and a second orbital 20 for supporting the first lens 14 and second lens 16. Although the illustrated embodiments are shown in the context of a pair of orbitals 18 and 20 which surround the respective lenses, anything in this specification can be adjusted to apply to eyeglass systems in which the frame only partially surrounds the lens or lenses, or contacts only one edge or a portion of one edge of the lens or each lens as well. In the illustrated embodiment, the orbitals 18 and 20 are connected by a bridge 22.

The eyeglass 10 is also provided with a pair of earstems 24 and 26 generally extending rearwardly from the front frame 12 for retaining the eyeglass on the head of the wearer. In addition, an open region 28 is adapted to receive the nose of the wearer, as is understood in the art. Nose region 28 may optionally be provided with a nosepiece, either connected to the lens orbitals 18 and 20, or the bridge 22, or directly to the lens(s) depending upon the particular embodiment. In some embodiments, the nosepiece may be formed by appropriately sculpting or shaping the medial edges of the orbitals and lower edge of the bridge 22.

In some embodiments, at least the orbitals 18 and 20, and the bridge 22, as well as other non-optical components of the eyeglass system, are manufactured from a high structural integrity material such as through an injection molding or casting process to provide high structural stability in at least the optical support portion of the final product. The orbitals 18 and 20 can be separately formed and assembled later with a separately manufactured bridge 22, or the orbitals 18, 20, and bridge 22 can be integrally formed such as by molding or casting in an integral unit.

In some embodiments, the earstems 24 and 26 are constructed in a manner that permits at least medial and lateral direction flexibility, to enhance the comfort for the wearer and accommodate a variety of head widths. Flexibility of the rearwardly extending ends of earstems 24 and 26 in the desired medial and lateral directions can be accomplished either through the use of flexible construction materials for the earstem as is known in the art, or through the use of relatively rigid earstems in combination with a spring, resilient hinge materials, compressible materials or other techniques which can be used to impart some flexibility and even a medial bias. In some embodiments, earstems 24 and 26 are connected directly or indirectly to the orbitals 18 and 20 through the use of hinges. However, non-hinged flexible or inflexible connections may also be used as desired.

Each orbital 18, 20 may be provided with an annular seat for receiving the lens 14, 16. The annular seat can be formed by the sidewalls of a channel extending radially outwardly into the orbital for surrounding the edge and a portion of the front and rear surface of the lens. In some embodiments, the seat may be formed by the posterior or anterior surface of an annular shelf for receiving the lens from the front or rear side of the eyeglasses.

The lenses 14, 16 may be retained in the front frame 12 in any of a variety of manners, depending upon the configuration of the orbital 18, 20. For example, in the illustrated embodiment, the lenses 14, 16 can be sufficiently flexible to be deformed and force-fit into the annular recess without changing the optics and/or fit of the eyewear 10 in any functionally significant manner.

A top frame 40 is configured to removably attach to an anterior surface of the front frame 12. In some embodiments, as illustrated, the top frame 40 can comprise a first top frame orbital 42 connected to a second top frame orbital 44 by a top frame bridge 46. The top frame 40 may be provided with first and second lenses, filters, or other structures in the wearer's field of view through the orbitals. However, as illustrated, the orbitals 42, 44 of the top frame 40 are open, without any lens or other structure within the orbitals 42, 44. In some embodiments, the top frame 40 can function solely as an opportunity to support aesthetic, decorative, and/or informational content to the anterior surface of the non-optical surfaces of the eyeglass 10.

In some embodiments, the omission of a lens from the top frame can allow the focus to be on the design and fit of the part. Furthermore, decreasing the weight of the top frame 40 by lens omission is an added feature.

One or more or all of the dimensions and configuration of the anterior surface of the top frame 40 can generally match, correspond to, align with, and/or be substantially equal to one or a plurality of the dimensions and configuration of the front frame 12. For example, in some embodiments, the outermost perimeter and/or shape of the top frame 40 can generally match, correspond to, align with, and/or be substantially equal to the outermost perimeter and/or shape of the front frame 12. In some embodiments, the outermost perimeter of the top frame 40 does not extend outwardly beyond at any point the outermost perimeter of the front frame 12. As shown, in some embodiments, one or more of these features can allow the top frame 40 to be secured to the anterior surface of the front frame 12 in a manner that gives the appearance of a unitary eyeglass, without the front frame 12 being visible behind the top frame 40 when viewed from the front.

A selection of multiple top frames 40 may be provided for interchangeable connection to any given front frame. The selection may include a plurality of geometrically identical top frames 40 differing only by aesthetic or graphic content on at least the anterior and/or the peripheral surface. Artistic content may include one or more solid colors, geometric or random patterned colors, graphical images or designs, and/or written material such as logos, symbols, or printed words. Additional detail of the top frames and aesthetic content will be discussed below.

As illustrated in FIG. 1, the top frame 40 is configured to be releasably secured to the corresponding front frame 12, enabling the wearer to select from a collection of a plurality of top frames 40 based upon aesthetic content, and easily and quickly customize the appearance of the eyeglass 10. In some embodiments, this can give the wearer the ability to repeatedly customize appearances such as to coordinate with articles of clothing or other fashion drivers which may change from day to day, without incurring the expense of buying redundant underlying ophthalmic or other types of eyeglasses.

Figure 4:
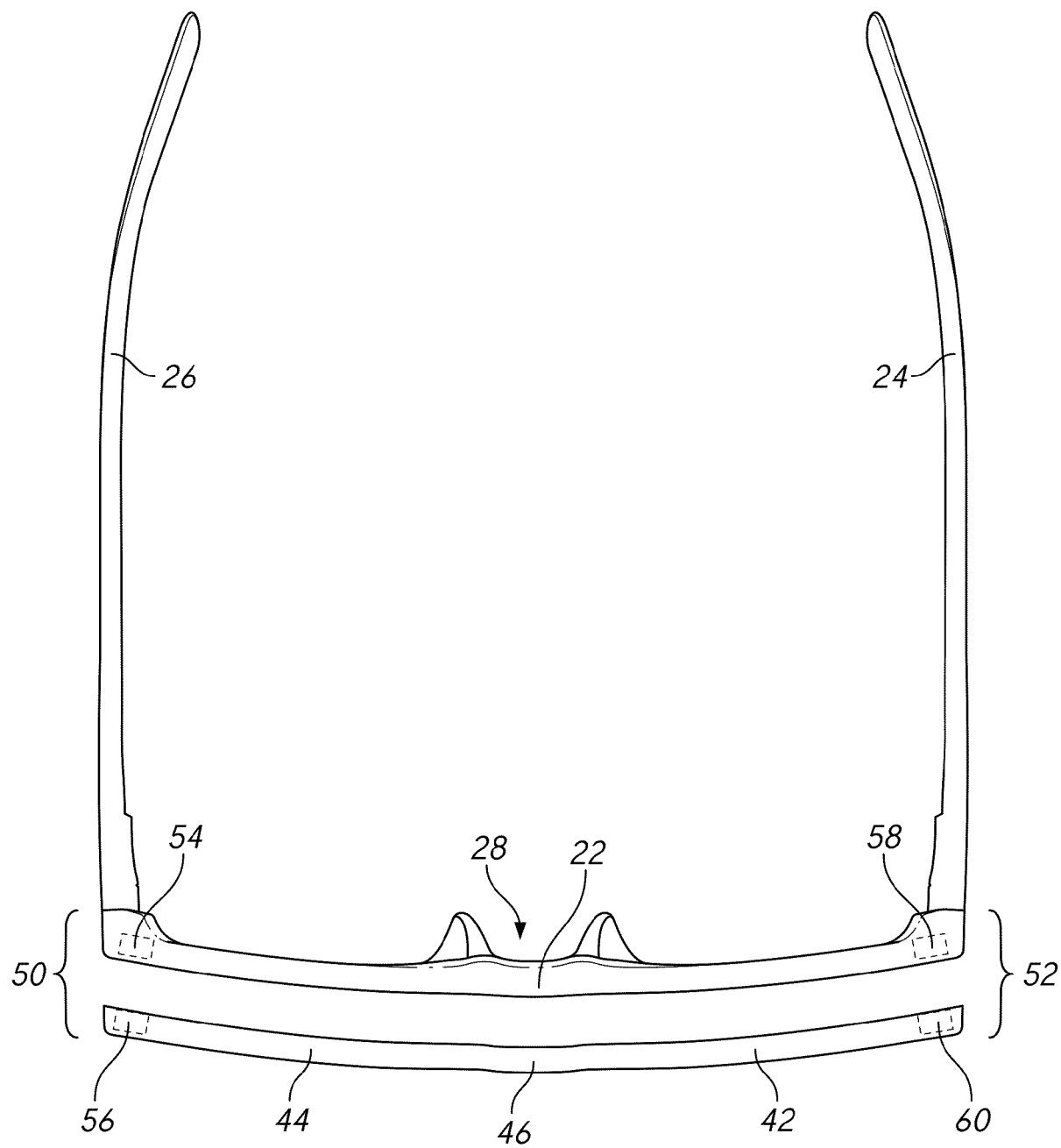
FIG. 4 is a top plan view of the eyeglass and top frame of FIG. 1.

Referring to FIG. 4, at least one, and preferably two or three or four or more connectors may be provided to releasably couple the top frame 40 and the front frame 12. Each of the connectors can comprise a first component on the front frame 12 and a second component on the top frame 40. In the illustrated implementation, a first connector 50 is provided at a first lateral side of the eyeglass 10 and a second connector 52 is provided at an opposing second lateral side of the eyeglass 10. As shown, the first and second connectors 50, 52 are respectively provided very close to the upper and outer lateral edges of the top frame 40 and/or the front frame 12. For example, as illustrated, the distances between the first and second connectors 50, 52 and the respective upper and outer lateral edges of the top frame 40 and/or the front frame 12 can be about the same as and/or less than or equal to: (a) about the amount of a thickness along one or more of the orbitals 18, 20, 42, 44 (e.g., a minimum thickness) in a region spaced away from the connectors 50, 52; and/or (b) about the amount of a thickness along one or more of the bridges 22, 46 (e.g., a minimum thickness). In some embodiments, as shown, there are no connectors provided or positioned between the first and second connectors 50, 52 on the front frame 12, and/or there are no other connectors anywhere on the front frame 12 for attaching the top frame 40 to the front frame 12 besides the top lateral connectors 50, 52.

Any of a variety of one or more connectors may be utilized, depending upon the desired performance. For example, one or more mechanical couplings can be provided, such as complementary pins and recesses, screws and complementary threaded apertures, or deflectable lever arms having a lateral projection for providing an interference fit with the complementary base or top frame, for example, may be used. In some embodiments, as illustrated, the connector system comprises a plurality of magnetic couplings, each of which includes a first magnet attached to or carried by the front frame 12 for magnetically coupling to a second, complementary magnet attached to or carried by the top frame 40. A first connector 50 can include a first base frame magnet 54, paired with a complementary first top frame magnet 56. A second connector 52 can include a second base frame magnet 58, paired with a complementary second top frame magnet 60. In some embodiments, a third or fourth connector may also be provided, such as in the vicinity of the bridge or nose piece. In some embodiments, the connection between the front frame 12 and the top frame 40 is formed only by magnetic forces, and not formed by any mechanical connectors.

In some embodiments, the orientation of the magnetic poles of each of the respective magnets on the front frame 12 are the same as each other, and/or the orientation of the magnetic poles of each the respective magnets on the top frame 40 are the same as each other and opposite from the orientation of the magnetic poles of the magnets on the front frame 12, on all of a plurality of interchangeable top frames 40. In this way, the respective polarities of the magnets will always induce an attractive force rather than a repelling force between the front frame 12 and the top frame 40, regardless of which of a plurality of top frames 40 are used.

Figure 3:
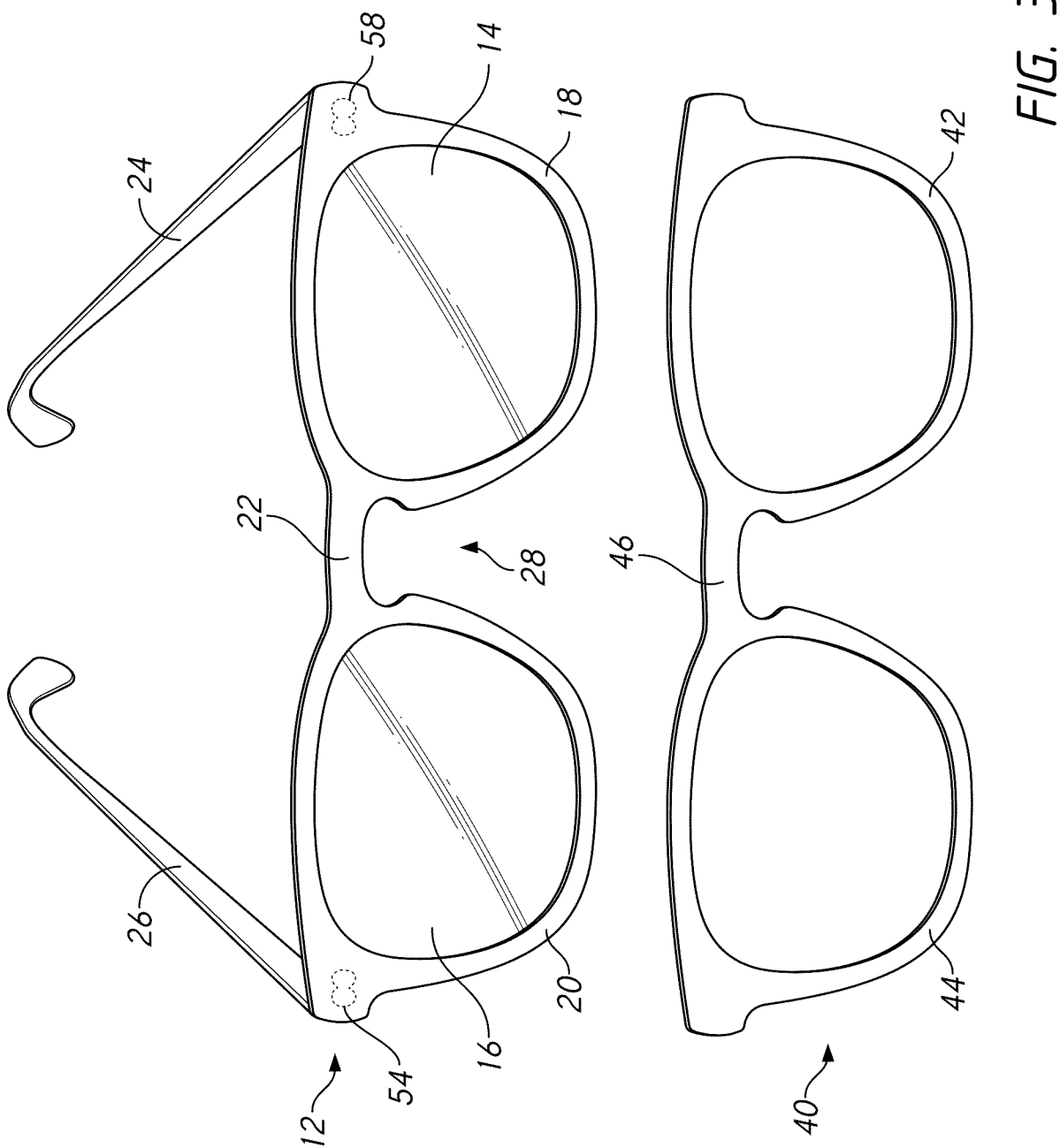
FIG. 3 is a front elevational view of the eyeglass and top frame of FIG. 1, spaced vertically apart.
Figure 5:
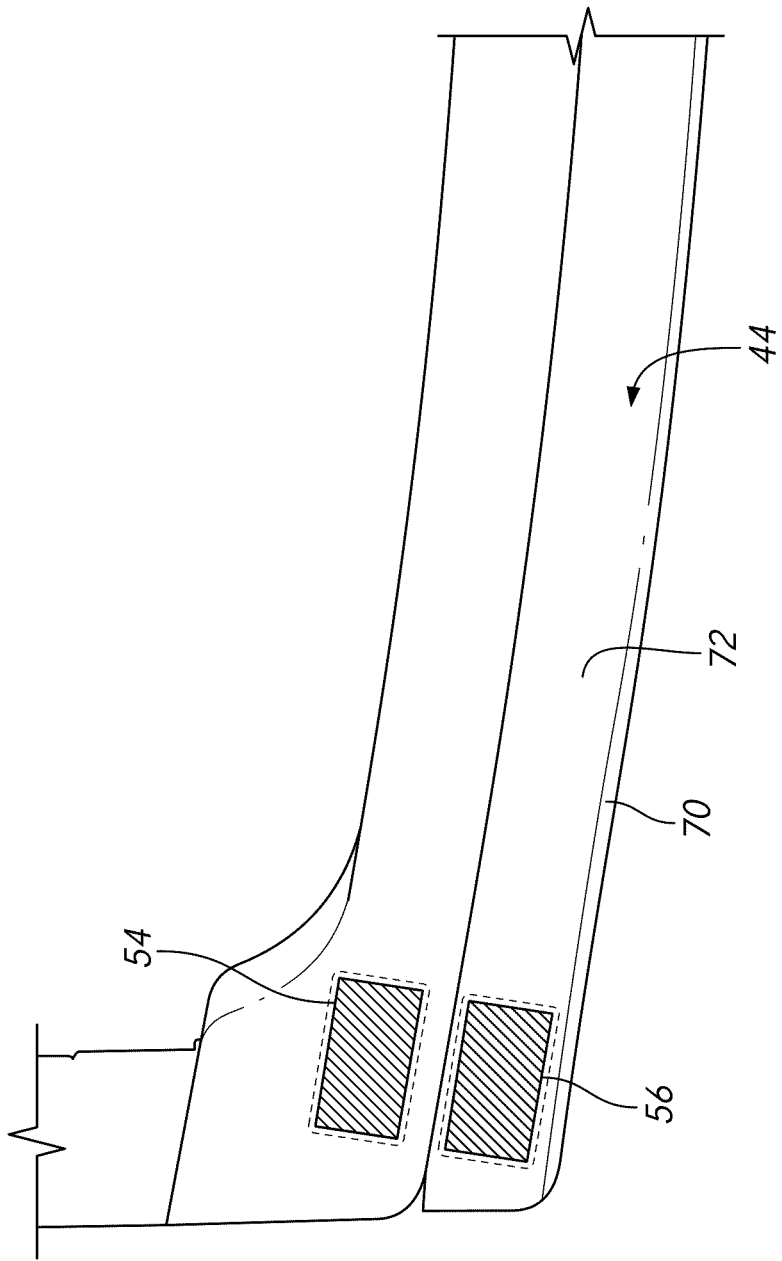
FIG. 5 is an enlarged horizontal cross-section of a lateral portion of the eyeglass and top frame of FIG. 1, shown in an as mounted configuration.
Figure 6:
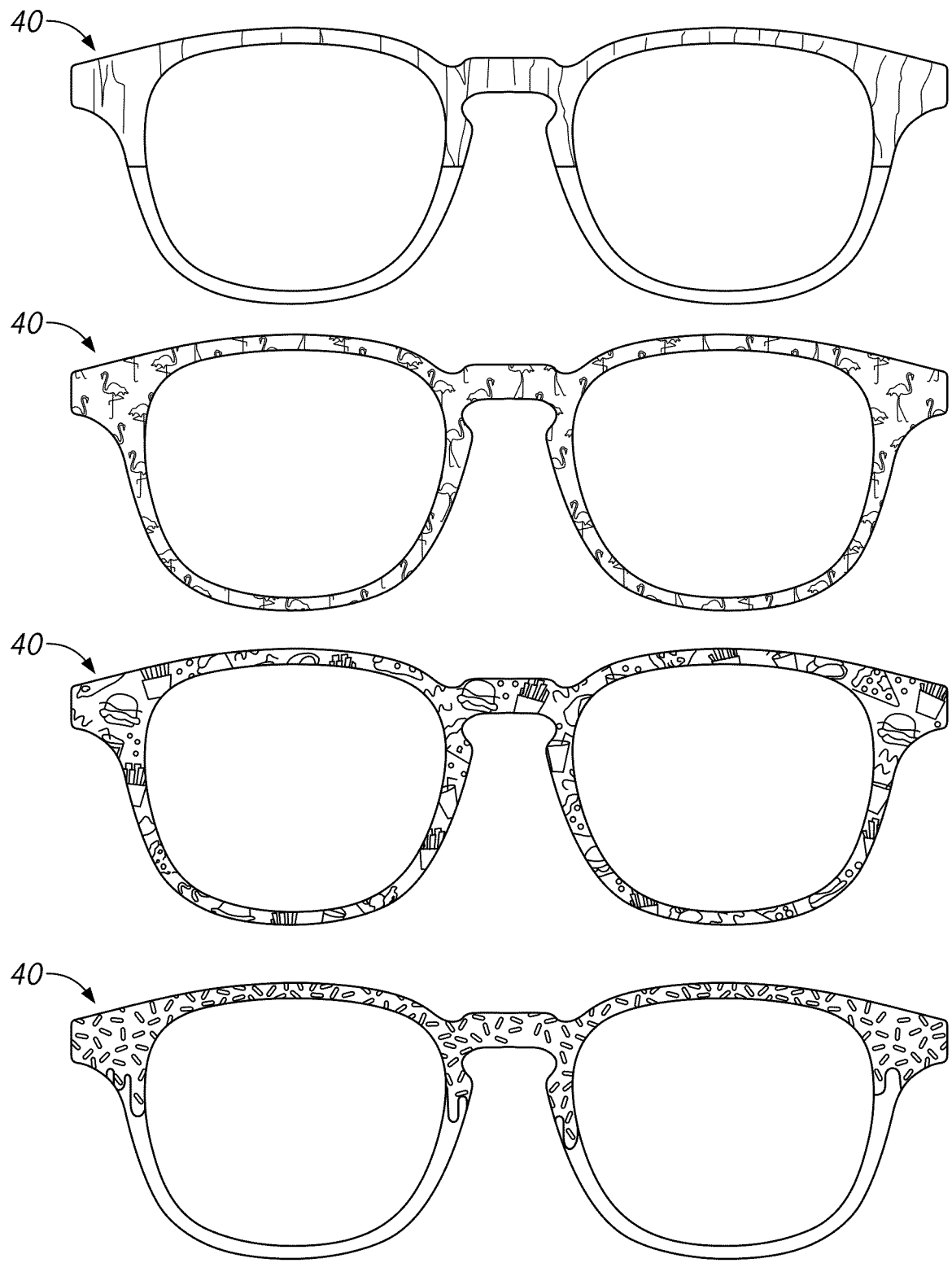
FIG. 6 shows an array of top frames having unique aesthetic anterior surfaces.

As shown in FIGS. 3-5, in some embodiments, a "complete" top frame 40 can comprise two full, continuous, and/or uninterrupted orbitals that are positioned anterior from and that extend around the perimeter of (or around substantially the entire perimeter of) the lenses held in place by the orbitals of the underlying front frame 12. As shown, in some embodiments, a complete top frame 40 can be attached to the front frame 12 by only or no more than two magnetics on the front frame 12 and only or no more than two magnets on the top frame 40, without requiring any additional magnets or magnetic couplings to securely and tightly hold the top frame 40 to the front frame 12. As illustrated, each of the two sets of magnetic couplings can be positioned only on the outer, upper lateral sides and/or edges of each orbital on each of the front frame 12 and the top frame 40. Providing only two sets of magnetic couplings can create one or more advantages in certain embodiments, including: (a) diminishing the number of parts in manufacturing and therefore the cost and weight of the product; and (b) diminishing the unaesthetic appearance of more than two magnets being visible on the front frame 12 when the top frame 40 is not attached, permitting a user to wear the front frame 12 by itself without a top frame 40 at times, if desired. As shown, in some embodiments, there are no magnets positioned below the upper portion or the upper half of the top frame 40, and/or there are no magnets positioned in a region of the top frame 40 (when attached to the front frame 12) that is below the bottom edge of the anterior end of either of the earstems 24, 26, and/or there are no magnets positioned on either bridge 22, 46. In some embodiments, as shown, all magnets on the front frame 12 can be positioned on the vertical anterior surface of the front frame 12 and all magnets on the top frame 40 can be positioned on the vertical posterior surface of the top frame 40; and/or no magnets are provided on any horizontal surfaces and/or on any other components or surface of the front frame 12, the top frame 40, and/or the earstems 24, 26.

In some embodiments, the top frame 40 can comprise one or more neodymium magnets that are securely attached to or embedded in the posterior surface of the top frame 40. Via magnetic attractive force, the top frame can be removably attached to the front frame 12 that can also feature corresponding one or more neodymium magnets that are securely attached to or embedded in the anterior surface of the front frame 12. In some embodiments, each of the respective magnets of the top frame 40 and/or front frame 12 can be positioned within the top frame 40 and/or front frame 12 at a depth that is less than or equal to about 1.2 mm and/or is greater than or equal to about 0.4 mm. In some embodiments, one or more of the magnets in the front frame 12 and/or top frame 40 are attached by providing a corresponding hole or recess within the surface of the front frame 12 and/or top frame 40 that is about the same as the thickness and/or cross-sectional width or diameter of the magnet. During manufacturing or assembly, the magnet or magnets can be held in place by a frictional force fit within the hole and/or the magnet or magnets can be held in place with an adhesive. As shown, the posterior outer surface of the magnet or magnets when positioned in the top frame 40 and/or the anterior outer surface of the magnet or magnets when positioned in the front frame 12 can be essentially flush with the respective surfaces of the front frame 12 and/or the top frame 40 that is or are generally adjacent to and/or generally surrounding the magnet or magnets. For example, in some embodiments, the magnet or magnets do not protrude out appreciably from the surfaces of the top frame 40 and/or the front frame 12 in which the magnets are positioned or inserted.

In some embodiments, any one or more components of the eyewear system, including the front frame 12, earstems 24, 26, and/or the top frames 40 can be constructed from a composition that includes a polymer, such as a thermoplastic amorphous polyamide (e.g., TR90). In some embodiments, the front frame 12 and/or the top frame 40 do not include any metallic component or metallic layer, except for the discrete magnets positioned in the respective upper laterally outward corners of the front frame 40.

The top frame 40 may be formed of multiple anterior and posterior layers having different opacities. For example, the top frame 40 can be provided with an opaque anterior layer 70 and a generally transparent posterior layer 72. As shown, the opaque layer 70 can be substantially thinner than the transparent posterior layer 72. In some embodiments, the top frames 40 (or any other component of the eyewear system) can be made in a two-shot mold of a polymer material such as TR90 where the anterior layer 70 of the top frame is a colored resin of white having a thickness that is generally less than or equal to about 1 mm and/or is generally at least about 0.3 mm. The posterior layer 72 of the top frame 40 may be formed by injection of a second shot that is of a generally clear non-optical grade resin. The various layers may be made of the same or different types of thermoplastic material. It is desirable for the thermoplastic material to be durable, flexible, and/or lightweight. In some embodiments, the top frames 40 are not made of acetate.

In some embodiments, the posterior layer 72 can be less than or equal to about 2 mm in thickness and is generally at least about 1 mm in thickness. In some embodiments, the combined shot thickness can be less than or equal to about 2.25 mm, and at least about 1.5 mm. In some embodiments, the top frame 40 can be constructed from a laminated system of a first posterior layer made of a thermoplastic material such as TR90 posterior and a laminated opaque (e.g., white) anterior layer. In some embodiments, any layer can exhibit any of the thicknesses and tolerances described anywhere in this specification.

As illustrated in FIG. 4, either or both of the front frame 12 and/or the top frame 40 can be non-flat, non-planar, non-straight, and/or curved. In some embodiments, as shown, a curved surface on either or both of the front frame 12 and/or the top frame 40 can include one or more discrete regions with one or more separate or distinct curvatures. In some embodiments the curvature can exist in a horizontal plane, or in a vertical plane, or in both horizontal and vertical planes. The one or more curved surfaces can be separate from each other but of about the same size and/or type of curvature, or the curved surfaces can be separate from each other and of different sizes and/or types of curvature. For example, as illustrated, the front frame 12 can include a first curvature along a first region (e.g., on the first orbital 18), a second curvature along a second region (e.g., on the bridge 22), and a third curvature along a third region (e.g., on the second orbital 20). As shown, the first curvature in the first region can be essentially the same size (e.g., less than or equal to about Base 4) and type (e.g. generally spherical or generally cylindrical) as the third curvature in the third region, and the second curvature in the second region can be different from the first and/or second curvatures. For example, as illustrated, the second curvature can have a smaller radius than the curvature in the first and third regions but can be of the same type (e.g., generally cylindrical or generally spherical). Similarly, as illustrated, the top frame 12 can include a first curvature along a first region (e.g., on the first orbital 42), a second curvature along a second region (e.g., on the bridge 46), and a third curvature along a third region (e.g., on the second orbital 42). As shown, the first curvature in the first region can be essentially the same size (e.g., less than or equal to about Base 4) and type (e.g., generally spherical or generally cylindrical) as the third curvature in the third region, and the second curvature in the second region can be different from the first and second curvatures. For example, as illustrated, the second curvature of the top frame 12 can have a smaller radius than the curvature in the first and third regions of the top frame 12 but can be of the same type (e.g., generally cylindrical or generally spherical).

As illustrated in FIGS. 4 and 5, when the top frame 40 is removably attached to the front frame 12, the corresponding curved surface or surfaces of each of the front frame 12 and the top frame 40 can be generally the same or essentially the same size and shape in the regions that are brought proximal to each other or made to contact with each other. For example, as shown in FIG. 5, when the top frame 40 and the front frame 12 are removably attached, the respective one or more curved surfaces can generally or substantially correspond, match, fit within, nest, and/or conform to each other in a sufficiently close manner that essentially no space, gap, and/or distance exists between them generally, substantially, or entirely along their respective perimeters. For example, the anterior surface of the front frame 12 can contact or closely fit with the posterior surface of the top frame 40 along generally all or substantially all of the perimeters of one or more or all regions or the front frame 12 and the top frame 40. In some embodiments, as shown, there can be a slight protrusion on the anterior surface of the front frame 12 caused by the bridge 22 and a corresponding slight recess on the posterior surface of the top frame 40 to closely or tightly receive the protrusion on the front frame 12. Some embodiments of any of these arrangements can provide one or more advantages, such as: (a) a tight, snug, and/or secure fit between the front frame 12 and the top frame 40, especially against undesired lateral or vertical movement; (b) a resistance to the passage of light, air, and/or debris between the front frame 12 and the top frame 40; and/or (c) an integral appearance between the top frame 40 and the front frame 12 such that these two components upon casual observation from one or more or all sides or angles can appear upon casual observation to be one component.

Figure 4A:
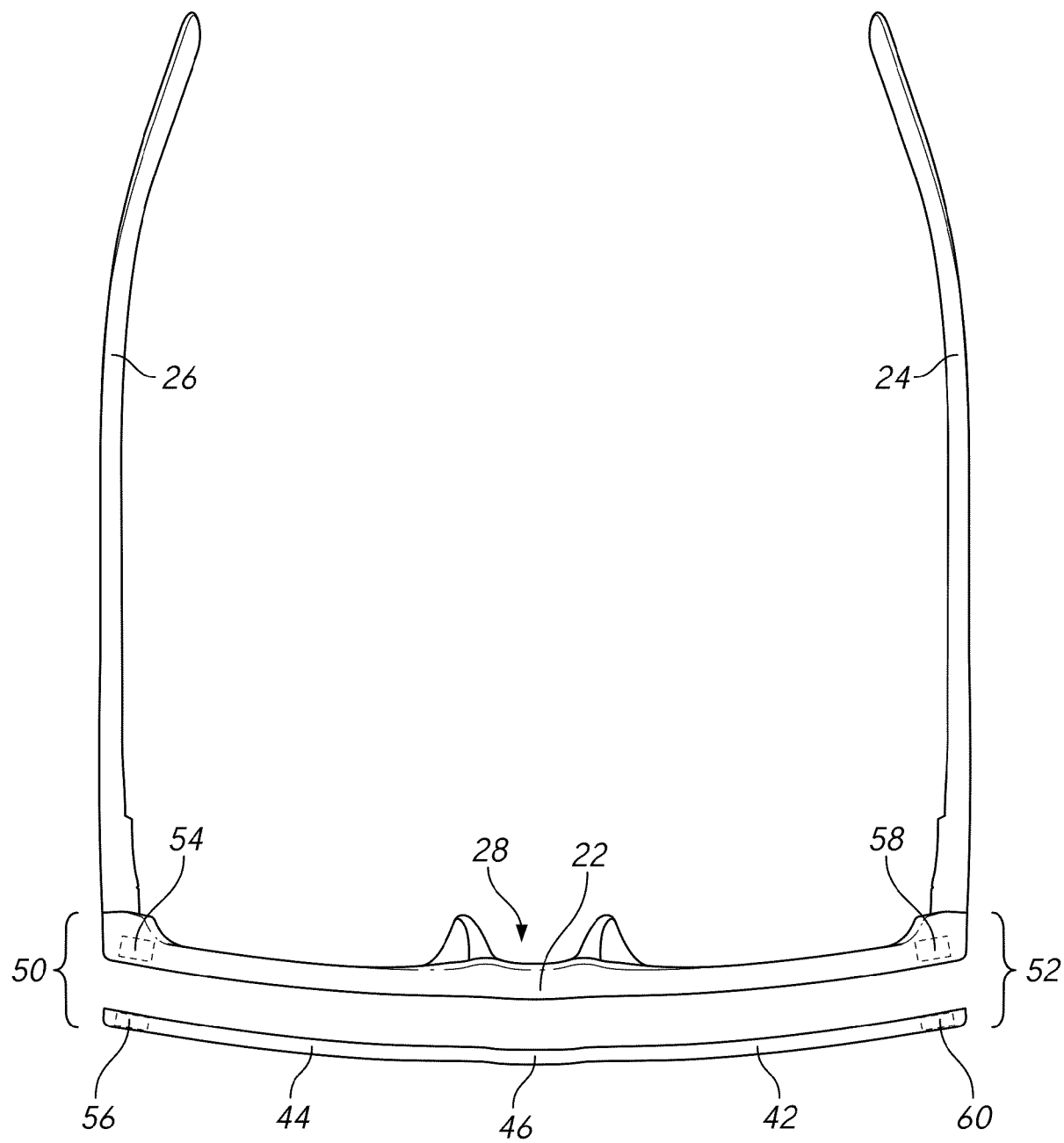
FIG. 4A is another top plan view of another embodiment of an eyeglass and top frame.

As shown in FIG. 4A, in some embodiments the top frame 40 can be substantially thinner than the front frame 12 of the eyeglass 10 in one or more or all regions, as measured between the respective anterior and posterior surfaces of each of the top frame 40 and front frame 12. For example, in some embodiments, the front frame 12 can be at least about twice as thick as the top frame 40. In some implementations, the top frame 40 can be less than or equal to about 3 mm or less than or equal to about 2 mm in thickness. Similarly, in some embodiments, the top frame 40 can be lighter than the front frame 12 of the eyeglass 10. For example, the front frame 12 can be at least about twice as heavy as the top frame 40. The lighter weight of the top frame 40 as compared to the front frame 12 can result from the top frame 40 being thinner and therefore having less mass, and/or being made from a lighter material, and/or lacking one or more lenses. As shown, the thickness of the top frame 40 and/or the thickness of the front frame 12 can be constant or substantially constant across the entire top frame 40 and/or front frame 12. As shown, in some embodiments, no portion of the top frame 40 extends into the front frame 12, and/or no portion of the front frame 12 extends into the top frame 40, when the top frame 40 is attached to the front frame 12. In some embodiments, thinner and/or lighter top frames 40 can provide one or more advantages: (a) a lower likelihood of unintended detachment of the top frame 40 from the front frame 12; (b) less weight on a user's face; (c) lower manufacturing cost; and/or (d) easier and more convenient storage and carrying of one or more interchangeable top frames 40. In some embodiments, the top frame 40 is highly bendable, resilient, and/or flexible, enabling the top frame 40 to tolerate normal daily movements, wear, dropping, or even normal stepping or crushing forces, without causing damage to the structural integrity of the top frame 40 and/or without materially or permanently changing the shape of the top frame 40.

Providing an eyewear with a thin top frame 40 that is also curved goes against the conventional approaches in this field. Thin eyewear structures are more likely to break if stressed, twisted, bent, or stepped on, in the rough and tumble daily use of eyewear. A curved eyewear structure is also more likely to break when stepped on than a flat eyewear structure because forcing a curved structure into a flat shape induces structural stresses, which can create an especially vulnerable region at the nose bridge (typically located at the peak of the curve). The conventional thinking did not lead those of skill in the art to use two design approaches that were both thought to create weaknesses in the structural integrity of eyewear. However, it has been discovered that a resilient or flexible, thin, and curved top frame 40 can provide various advantages while not sacrificing strength or durability, especially when the top frame 40 does not include lenses (which may otherwise favor frame rigidity to securely hold the lenses in place and to resist optical distortions).

As illustrated in FIG. 5, some embodiments can enable attachment between the front frame 12 and top frame 40 only by magnetic attraction and without requiring any mechanical coupling. As shown, in some embodiments, no part of the top frame 40 extends in a posterior, backward, and/or rearward direction past the anterior surface of the front frame 12 when the top frame 40 is attached to the front frame 12. All portions of the top frame 40 when attached to the front frame 12 can be positioned in front of the posterior surface of the front frame 12.

The top frames 40 anterior or posterior surface can exhibit any desired finish surface or coat, such as either a glossy or matte surface. This surface is measurable via instruments well known in the industry to categorize surface specular diffusion such as a specular excluded spectrophotometer. These measurements are correlated with contact angle measurements and the proper Dynes per centimeter squared for the desired in-mass decoration technique can be ascertained by a simple one-step spectral excluded measurement.

In some embodiments, for "glossy" parts the range for surface tension can be at least about 100 and/or less than or equal to about 1000 Dynes per centimeter squared. A secondary treatment process can be employed to temporarily change the molecular surface to a surface tension range that will bond with the desired in-mass decoration technique employed. Such treatments are well known in the industry and can include but are not limited to, plasma, flame, primer, paint, ablation via laser or chemical, chemical dip, and annealing.

In some embodiments, for "matte" parts, the surface tension range can be at least about 20 and/or less than or equal to about 100 dynes per centimeter squared. A secondary process generally may not be needed.

In some embodiments, the top frames 40 can be a lensless system in that the top frames 40 lack a recess to accept lenses and do not come with and are not intended to have a lens or lenses. The top frame 40 can be a decorative part that is meant for customization, or personalization, in the sense of fashion and personal expression. Top frames are in-mass decorated via means well known in the industry and can be but are not limited to direct Inkjet solvent, Inkjet UV, Water Slide or Cubic process, sublimation, paint, stamping, laser decoration, and/or lamination.

The white anterior surface can facilitate the in-mass decoration by providing a white surface to lay on top of and exhibit the full properties of reflective color, while the clear posterior surface can allow the additional bleed produced by each individual in-mass process to pass along or "waterfall down" an edge from the anterior surface to the posterior surface without noticeable results upon casual observance. In contrast, with an all-white or otherwise opaque part, the bleed would be seen in a visible cascade on the edge of the part as it gradients from the anterior to the posterior surface. Top frames can be mass decorated with third-party logo licensing and franchising, including MLB, MBA, DC Comics, Marvel Comics, and Harry Potter, for example.

In some embodiments, each of the main system parts can exhibit a mechanical radius of curvature, these curvatures are matched mechanically to provide a "fit" between the anterior surface of the top and the posterior surface of the base that enables the magnetic bond to exhibit a significant, measurable resistance to shearing forces and allows for no visible space between the surfaces upon casual observation. For example, by providing an anterior surface on the front frame 12 and a posterior surface on the top frame 40 that generally or substantially correspond, match, fit within, nest, and/or conform to each other, the respective coupling outer faces of the magnets on the front frame 12 and the magnets on the top frame 40 can be positioned in a generally coplanar orientation with each other when attached, providing maximum or full contact between the outer faces of the respective coupling magnets to induce maximum or full magnetic attractive forces. In contrast, when the respective curvatures of the front frame 12 and the top frame 40 do not match, it may otherwise be necessary for a user to manually force down a flat or otherwise non-conforming top frame 40 against a curved front frame 12, creating tension in the material of the top frame 40 and inducing a restoring force urging the top frame 40 back in the opposite direction. This arrangement may provide a poor fit and create a less secure connection between the front frame 12 and the top frame 40 because the bent top frame 40 is exerting a force in opposition to the respective coupling magnets. In some embodiments, as shown, no part of the top frame 40 is required to be bent, stretched, contorted, or twisted in order to attach and/or remove the top frame 40 to or from the front frame 12.

In some embodiments, the top frame 40 may be formed using a cellulose acetate top frame system that is pressed and cut. In some embodiments, the top frame 40 may be made from an injection molded part, which may provide more precision in the thickness and overall size due to the increased precision of tolerancing of the injection molding process. Going from a +1 -1 mm tolerance (injection molding) to a +0.005 - 0.005 with the press and cut method allows for a significant thinning of the parts. In some embodiments, the thickness of an acetate top frame 40 was on average about 3.49 mm and the thickness of a TR90 top frame 40 was about 2.15 mm on average. The flexibility of TR90 allows the overall strength and flexibility to increase. In some embodiments, with a stiffness at 0.0032 EI less than acetate, a TR90 top frame 40 is generally more flexible and more impact resistant. In some embodiments, the Young's modulus of the TR90 top frame 40 can be less than the acetate top frames 40, having overall more elasticity on average at about 3.25 EF less gigapascals.

In some embodiments, the top frame 40 is clear on the anterior surface and white on the posterior surface, allowing the in-mass decoration technique to "waterfall" off the edges without leaving visible bleed marks. With an all-white part, the bleed from in-mass decoration may "waterfall" off the part and leave visible trails on the edge of the part. In the TR90 top frame 40, the magnetic cavity can be part of the mold or can be cut out so that the neodymium N52 magnet can be precisely positioned.

Bending stiffness (EI) is the term used to describe the flexural rigidity of a member or the capacity to resist bending. The units for bending stiffness are N • m2. Tensile modulus (EF) is calculated from the initial slope of the load-deflection curve, which is the slope before any yielding or permanent deformation. A higher number is more rigid. In some embodiments, EF for the material of which the top frame 40 is made is at least about 1400 MPa, or at least about 1500 MPa, or at least about 1600 Mpa.

The magnets (e.g., Neodymium N52 magnets) can be embedded or otherwise attached to or positioned in the respective posterior surface of the top frame 40 and the anterior surface of the front frame 12. The magnets can have any shape or size to provide a suitable attachment force to maintain the top frame 40 in place during normal activities but that is not overly difficult to remove by a user when desired. In some embodiments, the magnets are very small, for example less than or equal to about 7 mm in diameter or cross-sectional width, and/or less than or equal to about 7 mm in diameter or cross-sectional width, and/or about 5 mm in diameter or cross-sectional width. In some embodiments, the magnets can be very thin, such as less than or equal to about 2 mm in thickness, and/or less than or equal to about 1.5 mm in thickness, and/or about 1.2 mm in thickness.

In some embodiments, the magnets can be precision placed at about 0.47 mm from the anterior surface with about a ± 0.03 mm tolerance but may be placed at about 0.6 mm but no more than about 0.1 mm with a tolerance of a ± 0.03 mm. The magnet(s) in the top frame can be placed so that the posterior side of the N52 magnet in the top frame is exposed and is generally even with the final layer of the posterior surface. The front frame 12 and the top frames 40 magnetic poles can be always oriented in the same direction, meaning if the attracting poles are inward-facing on the top frame 40 and outward-facing on the base frame 12 then this is consistent across all styles and all front frames 12 and all top frames 40. This provides predictability and compatibility when attaching a top frame 40 to a base frame 12.

In some embodiments, a high-strength but conveniently removable magnetic coupling can be provided between the front frame 12 and the top frame 40 to resist unintentional decoupling, loss of or damage to the top frame 40, and/or appreciable gaps between the front frame 12 and the top frame 40. In magnetics, the strength of a permanent magnet can be measured using the maximum energy product, which is typically measured in units of either kJ/m3 (kilojoules per cubic meter) or MGOe (mega-gauss-oersted). The maximum energy product represents the density of magnetic energy in the material. In some embodiments, the respective magnets provided in the front frame 12 and/or top frame 40 can have a maximum energy product of at least about 40 MGOe and/or less than or equal to about 60 MGOe (between about 320 kJ/m3 and about 480 kJ/m3), or at least about 48 MGOe and/or less than or equal to about 52 MGOe (between about 380 kJ/m3 and about 415 kJ/m3).

The pull force is a measure of the force required to decouple the top frame 40 from the front frame 12 by pulling the top frame 40 forward, in an anterior direction away from the wearer's face. When comparing magnets of a given shape, the pull force of the magnetic material is generally proportional to the maximum energy product, sometimes referenced as the N-number. In some embodiments, the respective magnets located in or on the front frame 12 and/or top frame 40 can each create a magnetic pull force that is at least about y and/or less than or equal to about 4.5 N (between about 0.91 lbf and about 0.99 lbf). In some embodiments, when the respective magnets are attached to and/or embedded in the front frame 12 and/or top frame 40, the sheer force required to slide each respective, individual magnetic in the top frame 40 away from the corresponding individual magnet to which it is coupled in the front frame 12 (by shifting these parts from each other laterally, vertically, and/or horizontally) can be at least about 0.5 N and/or less than or equal to about 1.0 N.

In some embodiments, during manufacturing, the top frame 40 can easily be manipulated by an End Of Arm Tool that has an electromagnet embedded in a non-ferritic surface such as a Delrin® or injected polycarbonate. This allows the embedded Neodymium N52 magnet in the top frames 40 to bond with the electromagnet of a tool which can be selectively turned on or off to allow for placement or pick up during assembly or packaging.

The top frame 40 and the base frame can both exhibit a neodymium-to-neodymium bond with measurable, repeatable, and toleranced strength. in some embodiments, this gives the ability to not require any mechanical attachment to additionally clip the top frames to the base frames, relying only on magnet-to-magnet bonding that is seamless to detach and attach. Some detachable sunglass clips are known in the industry to have a mechanical clip that assists in the bonding of the two materials. In some embodiments, sunglass clips are known to have magnets while the base frame has a receptive ferritic plate. With Neodymium magnets, the N-type can be specified with a prescribed holding force and controlled for quality and consistency.

In some embodiments, the complete system of a base frame and interchangeable top frames works correctly and consistently by providing a range of ophthalmic options while still providing mechanical frame curvature fit. In accordance with standard meanings in the industry:

In some embodiments as the context dictates, base curvature can be a measurement of the optical power of a lens reported in diopters. In general, this is a reference to how much a lens bends light.

In some embodiments as the context dictates, radius can be a mechanical measure of a lens's physical curvature, comparing the lens to a portion of a surface of a sphere or cylinder that corresponds to the shape of the lens.

In some embodiments as the context dictates, frame curvature can be the mechanical curvature of the frame created to accept certain Base lens curvatures or ranges of curvatures. This is often referred to incorrectly as the frame base curvature, i.e.- three base frame, four base frame.

In some embodiment, the surfaces of the lenses or optical zones lie on the surface of a solid geometric shape having a curve of substantially constant radius along what is the horizontal meridian of the eyeglasses. Thus, for example, the front surface of one embodiment of the eyeglass frame conforms generally to a curve such as a base 4 curve. Other base curves can be readily used if desired, such as to accommodate either prescription (corrective) lenses or noncorrective lenses.

With purpose-built internal calculation tools, the base frame range of acceptance can be calculated using the minimum blank size, the cut position on the blank, the position of optical center vs. pupillary distance, and decentration. The edge thickness and the center thickness together can be used to determine the lens base curvature that best holds the base frame mechanical curvature true. The system can utilize the base frame mechanical curvature to identify lenses in the wearer's prescription. The range can be sorted by the lens base in diopters and pivots about the index of refraction of the material as the index will determine to what degree the material will bend light.

These values with the index can keep the end user's prescription ranges within the range of base curvatures to generally match the base frame mechanical curvature range of acceptance at a base curvature that is at least about 1 and/or less than or equal to about 4. This can allow the curvature of the front frame 12 and the top frame 40 to generally match or correspond, generally leaving no visible space between the anterior and posterior surfaces on the top frames 40 and front frames 12 upon casual observation, even across a range of difference prescriptions for an end-user.

The front frame 12 generally has a mechanical curvature that is substantially constant. This is used to make sure the top frame 40 can fit with no visible space between the posterior surface of the top frame systems and the anterior surface of the base frames system upon casual observation. In some embodiments, the mechanical curvature will accept a very small range of lens base curvatures as the lens base curvature can cause the frame's mechanical curvature to move out of alignment or for the lens to protrude too much on the posterior surface or anterior surface. This can cause the top frame 40 to not fit correctly and will in turn not have a good mechanical bond from the Neodymium magnets of the top frame system to the Neodymium magnets of the front frame.

The range of bases and the appropriate prescriptions for each of these ranges can be calculated from a complex system of factors to account for edge thickness, center thickness, and minimum blank size. In some embodiments, using the material index to minimize thickness and to adhere to the system's strict tolerancing standards can help optimize the lens size (e.g., minimum thickness and/or weight) across a range of different prescription values using that the same mechanical curvature for the front frame 12. In some embodiments, this system can use Aspheric lenses to help minimize thickness and accommodate prescription ranges with high minus and high plus ranges.

The prescriptions can be made into range charts that are used as a base for a front-end user experience online and at retail locations when ordering prescriptions. For example, when a consumer enters online their prescription frames that fit the prescription lens base curvature, the allowable base frame mechanical curvature can be displayed. This approach can utilize the same the mechanical curvature for a broad range of prescriptions, ensuring that the systems of top frames 12 fit correctly while offering superior optics. The range charts provide a framework to stay inside of and allow both front-end users and customer service to select the correct lenses for the matching prescription. In the industry, it is well known to base lens offerings on price, premium, and super-premium tiers. In contrast, in some embodiments, the base curvature of the system and the prescriptions flows from holding constant the mechanical curvature of the Base frame system.

In some embodiments, a 1-4 Diopter base can be used. By moving indexes of material, the system can compensate for variations in a user's prescription. For instance, a -3.75 diopter lens will be too thick in polycarbonate; however, the same lens in a 1.60 index material with result in a lens that will hold the base frame system mechanical curvature.

The lens base curvature can be determined by using the sagittal depth formula to find radius and calculating the dioptric power with the radius and the index of refraction of the lens material. The lens "base" is then designated by D (base) and the lens "radius" is designated by R.

The lens radius of curvature is used in conjunction with the sagittal depth formula to determine the lens base, the base system is reported in diopters. The lens radius is mechanical while the lens base curvature is optical.

In some embodiments, automation and communication are folded into two parts: the front end systems and the back end systems. In the front-end system, PO's are processed by appending and sorting by style into hot folders that are picked by a nesting processor. The processor can be an off-the-shelf processor or a custom processor. Many types and brands of processors are well known in the industry. The front-end system can use a node to parse the incoming CSV files appending the file names of all the files with designated quantity to print given from the CSV file.

Next, the front-end system can automatically sort the files by base frame style into hot or priority folders that will then get picked and processed by the nesting software. In some embodiments, final files are saved in PDF 4XA format and sent to a printer. In some embodiments, files could also be saved in a PDF format, or even an EPS format, or any other format as desired. The system can place any file onto a nest of like styles. In some embodiments, this yields 41 (average) different prints or all the same print per nested jig. The front-end system can provide each individual file with a QR code added to the left eyewell. This QR code can contain the relevant information about the style and design, SKU numbers, and UPC.

In some embodiments, once a full nest is made a jig is loaded in the printer and printed. The back-end system is engaged. The back-end system is a system of scanning carts that are battery-powered with QR code scanners running raspberry Pi's that will then scan the QR codes. A custom script on the Raspberry Pi looks for an exact name match based on the UPC in a directory of saved PDFs. Once that match is made the script takes the file and sends it to a Linux CUPS printing system and prints it on a sticky label. The label is placed on a polybag and the product is placed inside that bag ensuring that the physical product is never separated from UPC and SKU after printing.

Jigs

In some embodiments, the print platform system is comprised of a layered system alternating between ferritic and non-ferritic "filler" layers providing both rigidity and light weighting. Using these alternating layers, a lightweight system (e.g., less than about 1 pound) can be created that has a posterior and anterior ferritic base material making it magnetic receptive. A special temporary low adhesion premasking layer is applied by rolled force or by hand. This gives a surface to UV print the optical guides that aid in manual or robotic placement. The UV print can be used in the same manner that is widely known in the industry for UV curable or 3D printing, offer referred to as rapid prototyping. This gives a raised edge that will assist in mechanically locking the parts into place when paced by hand or with a robot. Further assisting the placement bond of the top frames 40 once placed are the systems N52 neodymium magnets polled and tolerance. The magnetic top frames bond to the steel with a magnetic to magnetic receptive bond (ferritic) keeping precise positioning during the printing process. This gives us precise printing and logo placement, with a repeating tolerance of between about -zero and about 0.02 mm.

The following is claimed:
1. An eyewear comprising:
    a base frame comprising an anterior surface with a curvature and a perimeter, and left and right lenses;
    a top frame comprising:
        a left opening on the top frame configured to be positioned in front of the left lens of the base frame when the top frame is attached to the base frame, and a right opening on the top frame configured to be positioned in front of the right lens of the base frame when the top frame is attached to the base frame, the left and right openings not including lenses;
        a bridge positioned between the left opening and the right opening;
        a pre-attached shape with a curved posterior surface with a perimeter on the top frame that corresponds to the curvature of the perimeter of the anterior surface of the base frame to which the top frame is configured to attach such that the anterior surface of the base frame closely fits with the posterior surface of the top frame along the perimeters of the base frame and the top frame; and
        at least two magnets on the top frame that enable the creation of a force configured to removably attach the top frame to the base frame;

wherein the top frame is made of a material that is more flexible than a material of the base frame to which the top frame is configured to attach; and wherein the top frame is configured so that, when removably attached to the base frame, the top frame is not required to be contorted to attach the top frame to the base frame, and the top frame has no part that extends in a posterior direction past the anterior surface of the base frame.

2. The eyewear of claim 1, wherein an outermost perimeter of the top frame is configured to not extend outwardly beyond an outermost perimeter of the base frame when the top frame is removably attached to the base frame.

3. The eyewear of claim 1, wherein an anterior surface of the top frame comprises an aesthetic appearance that is different from an aesthetic appearance of the anterior surface of the base frame to which the top frame is configured to attach.

4. The eyewear of claim 1, wherein the top frame is resilient.

5. The eyewear of claim 4, wherein the material of the top frame comprises a thermoplastic amorphous polyamide.

6. The eyewear of claim 1, wherein a posterior layer of the top frame is optically transparent.

7. The eyewear of claim 1, wherein a thickness of the top frame is less than a thickness of a front portion of the base frame to which the top frame is configured to removably attach.

8. The eyewear of claim 1, comprising an optically opaque layer and an optically transparent layer.

9. The eyewear of claim 1, wherein the magnets comprise neodymium.

10. The eyewear of claim 1, wherein the magnets are flush with the posterior surface of the top frame.

* * * * *

UNITED STATES PATENT AND TRADEMARK OFFICE
CERTIFICATE OF CORRECTION

| | |
|---|---|
| PATENT NO. | : 11,809,018 B2 |
| APPLICATION NO. | : 17/858908 |
| DATED | : November 7, 2023 |
| INVENTOR(S) | : Philip Denton Gordon et al. |

It is certified that error appears in the above-identified patent and that said Letters Patent is hereby corrected as shown below:

On the Title Page

Page 2, Column 1, Line 8 of item (56) U.S. Patent Documents, delete "VanAtta" and insert -- Van Atta --

In the Specification

Column 13, Line 42, delete "y" and insert -- 4.0 N --

Signed and Sealed this
Sixteenth Day of April, 2024

Katherine Kelly Vidal
*Director of the United States Patent and Trademark Office*